No. 702,780. W. DARLING. Patented June 17, 1902.
EGG TRAY.
(Application filed Nov. 9, 1901.)
(No Model.) 3 Sheets—Sheet 2.

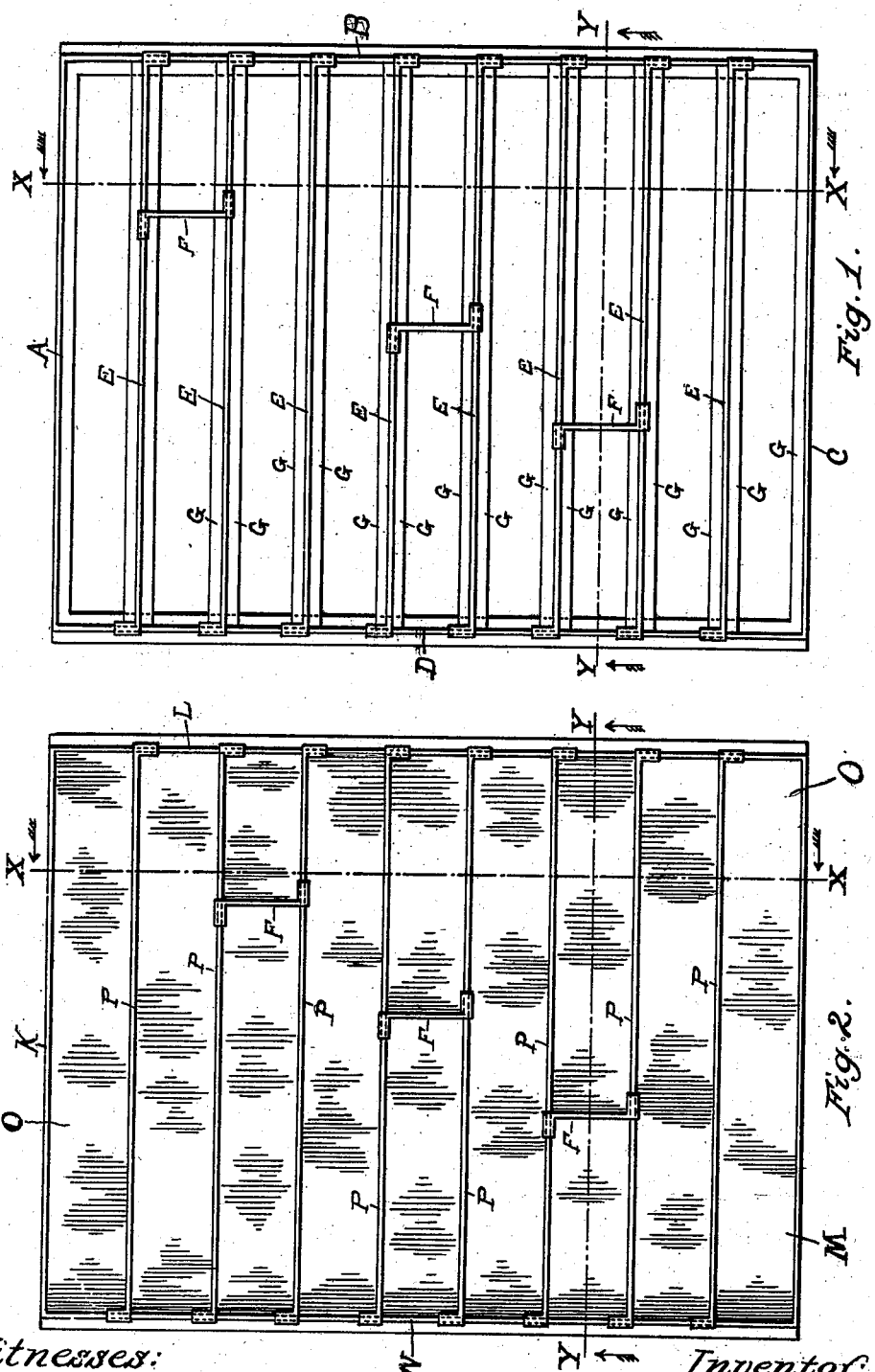

Witnesses:
J. C. Duvall.
R. E. Randle.

Inventor:
WINFIELD DARLING,
by his attorney,
Robert W. Randle.

No. 702,780.  
W. DARLING.  
EGG TRAY.  
(Application filed Nov. 9, 1901.)  
Patented June 17, 1902.

(No Model.)

3 Sheets—Sheet 3.

Witnesses:  
S. C. Duvall.  
R. E. Randle

Inventor:  
WINFIELD DARLING,  
by his attorney,  
Robert W. Randle.

UNITED STATES PATENT OFFICE.

WINFIELD DARLING, OF SOUTH SETAUKET, NEW YORK.

EGG-TRAY.

SPECIFICATION forming part of Letters Patent No. 702,780, dated June 17, 1902.

Application filed November 9, 1901. Serial No. 81,657. (No model.)

*To all whom it may concern:*

Be it known that I, WINFIELD DARLING, a citizen of the United States, residing at South Setauket, in the county of Suffolk and State of New York, have invented certain new and useful Improvements in Pedigree Egg-Trays; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates more particularly to egg-trays to be used in conjunction with incubators; and the object of my improvements is to provide an arrangement for the purposes of keeping a correct record of each particular egg and of the hen producing it—viz., first, by what hen the egg was laid; second, date the egg was laid; third, the condition of the egg or chick after the proper period of incubation; fourth, for keeping a record of the pedigree of each chick hatched in my tray, and, fifth, for obtaining other items of interest and value to the owner. I attain these objects and others not specifically mentioned by the mechanism and arrangement illustrated in the accompanying drawings, in which—

Figure 3:
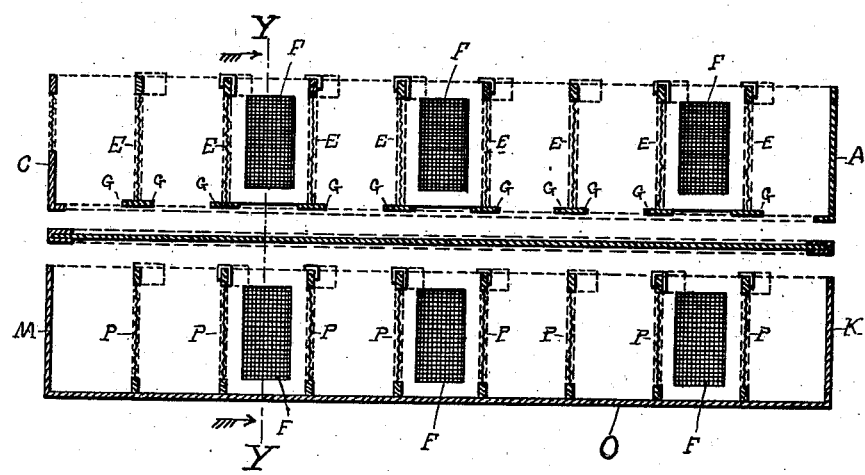
Figure 4:
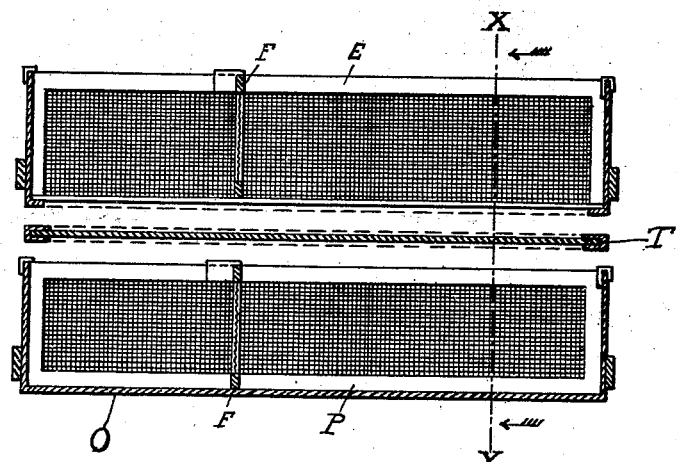
Figure 5:
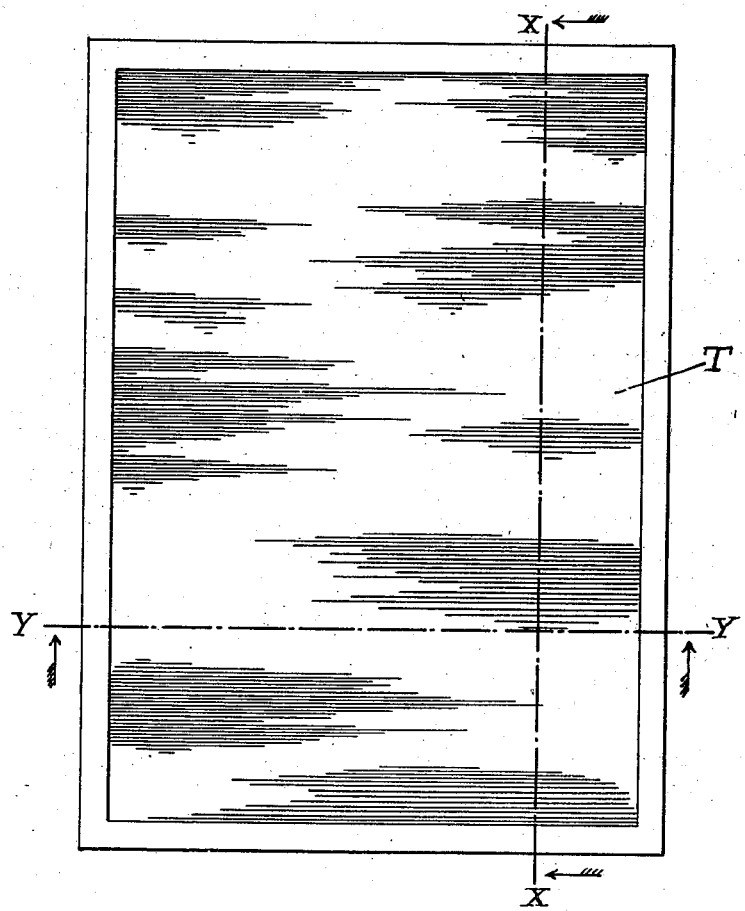
Figure 6:
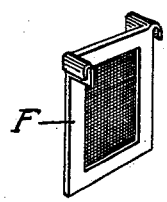

Figure 1 is a plan view of my incubating-tray. Fig. 2 is a plan view of my nursery-tray. Fig. 3 is a longitudinal section of both the incubating and the nursery trays, taken on the line X X of Figs. 1, 2, 4, and 5. Fig. 4 is a cross-section of both the incubating and nursery trays, taken on line Y Y of Figs. 1, 2, 3, and 5. Fig. 5 is a plan view of the partition to be used between the incubating and the nursery trays, and Fig. 6 is a perspective detail view of one of the movable auxiliary partitions to be used in both the incubating and nursery trays.

Similar letters of reference denote and refer to similar parts throughout the several views.

My incubating-tray, Fig. 1, is composed of an outer frame A, B, C, and D, which parts form perpendicular walls, the space thus inclosed being divided by partitions E, of which there are eight shown in Fig. 1, arranged substantially as shown, the ends of the partitions E being supported at their extremities by the parts B and D and slidably attached thereto.

F represents auxiliary movable partitions, which can be used interchangeably in both the incubating and nursery trays.

G represents flanges extending out at right angles from the lower edges of the parts marked E.

My nursery-tray, Fig. 2, is composed of an outer frame K, L, M, and N, which parts form four walls, this tray being provided with a solid bottom O. The space inclosed by K, M, L, and N is divided by partitions P, of which there are eight shown in Fig. 2, which are to be placed beneath and in alinement with the partitions E of the incubating-tray. The spaces formed by the partitions P are subdivided by auxiliary partitions F in the same manner as those in the incubating-tray, Fig. 1.

My improvements are intended to be used in any well-known make of incubator by replacing the trays commonly used therein and substituting my arrangement and arranging the parts in the order shown in Figs. 2 and 4.

It is apparent that eggs can be placed in the incubating-tray, Fig. 1, between the partitions E, the flanges G supporting the eggs so that they will not pass through the spaces between the partitions G. The eggs can also be supported by the independent bottom or partition T, which can be kept in contact with the under side of the incubating-tray until within a short time before the eggs are due to hatch, when it should be removed. It can be seen that when an egg has hatched out the chick will fall through the space in the bottom of the incubating-tray into a division in the nursery-tray. Desiring now to carry out the objects stated in the early part of this specification I place the eggs of a particular hen, breed, or day in the incubating-tray and then insert one of the partitions F at the point to which they extend, thus dividing said eggs from those which may hereafter be placed in the tray. I then place a partition F in the nursery-tray opposite to the partition F in the incubating-tray and then enter on a book or chart such information as I desire to keep a correct record of said eggs. After I have filled the incubating-tray with the eggs properly divided and a record made of their location I place the incubating-tray in the incubator, at which time or just before the eggs are due to hatch I place the nursery-tray immediately beneath it. It is apparent that if the partition T be removed from between the two trays as the chicks hatch out they will drop into the nursery-tray, after which I insert the partition T between the two trays and remove the nursery-tray from the incubator, the partition T serving as a cover therefor, and carry it to the brooder, where I remove the chicks from the nursery-tray one at a time and provide each chick with an identifying-mark, such as a metal tab containing its number, which will correspond with the record previously taken. By this arrangement it will be seen that I keep a complete record and pedigree of each chick and also a record of the unhatched eggs and by which hen or breed they were produced.

The central portions of the partitions E and F should be made of wire screen, as shown in the drawings, for the purpose of affording ventilation between the various divisions.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages.

I wish it understood that I dedicate no part of my invention to the public, and I wish just and adequate protection for every feature that may be judged as new and which involves invention.

Having now fully described my invention and the manner of using the same, what I desire to secure by Letters Patent of the United States is—

1. In a pedigree egg-tray, the combination of an incubating-tray, provided with an open bottom and movable partitions; a nursery-tray with a solid bottom and movable partitions; and, an independent partition to divide the two trays and to serve for a cover for the latter, all substantially as shown and described and for the purposes set forth.

2. In combination with a nursery-tray, of an incubating-tray adapted to be placed over the nursery-tray, the movable partitions of each being adapted to be placed in alinement with each other, substantially as shown and described, and for the purposes set forth.

3. In a pedigree egg-tray, the combination, of the incubating-tray and the nursery-tray each formed with an outer rim and divided into compartments with an independent partition to be used between them, all substantially as shown and described.

In testimony whereof I have signed my name to this specification in the presence of two subscribing witnesses.

WINFIELD DARLING.

Witnesses:
WM. H. GRAY,
R. A. GRAY.